July 10, 1934.  G. GULLNER  1,965,640
COUPLING SYSTEM
Filed Aug. 6, 1931
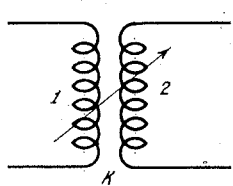
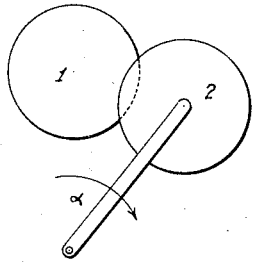
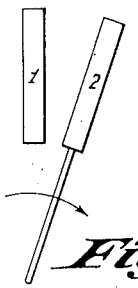
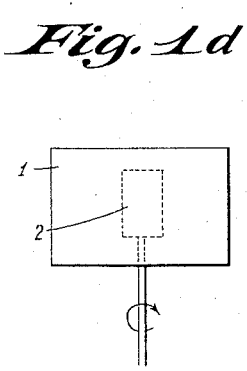
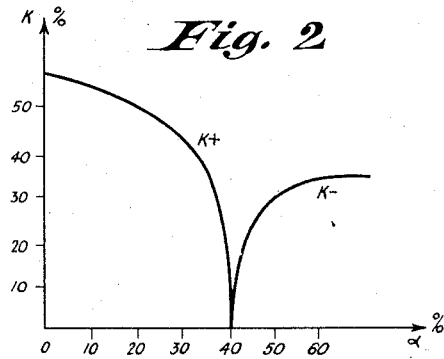
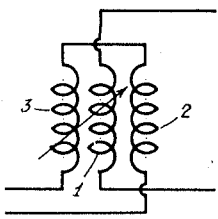
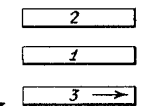
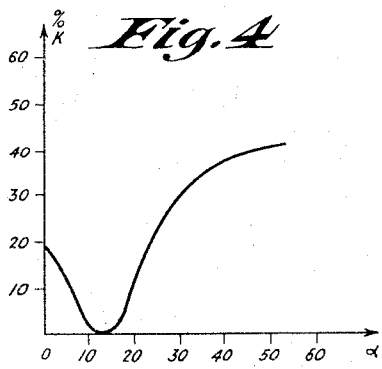
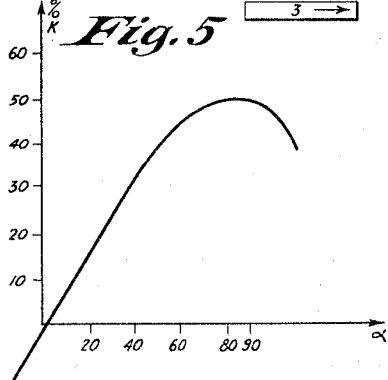
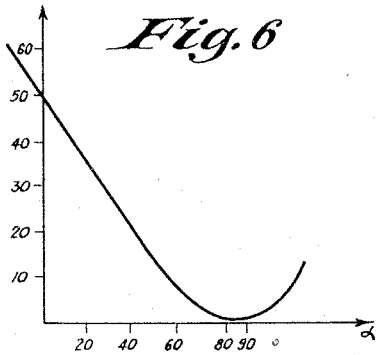
INVENTOR
GEORG GULLNER
BY
ATTORNEY Patented July 10, 1934

1,965,640

UNITED STATES PATENT OFFICE 1,965,640

COUPLING SYSTEM

Georg Gullner, Berlin, Germany, assignor to Telefunken Gesellschaft für Drahtlose Telegraphie m. b. H., Berlin, Germany, a corporation of Germany Application August 6, 1931, Serial No. 555,510
In Germany October 2, 1930

2 Claims. (Cl. 171—119)

The present invention relates generally to coupling systems and more particularly to inductive coupling systems used to regulate the transfer of energy from one coupled circuit to another.

In the drawing,

Figure 1a represents generally a coupling system for two circuits which is variable;

Figures 1b, 1c and 1d represent different mechanical systems for varying the coupling between two circuits;

Figure 2 is a curve sheet used in explaining certain features of the present invention;

Figures 3a and 3b show coupling systems constructed in accordance with the present invention; and, Figures 4, 5 and 6 illustrate curve sheets utilized in explaining the operation of the systems disclosed herein.

In the case shown in Fig. 1b change of coupling is mostly attained by that coil 2 is caused to turn parallel past coil 1. In Fig. 1c coil 2 is separated from coil 1 about a hinge. In Fig. 1d coil 2 is turned into or before coil 1. However, all of these arrangements involve the drawback that zero coupling is located at a steep point of the curve illustrative of the coupling relation so that it is more difficult of adjustment, whereas for close or strong coupling the curve is very flat or gradual in change. The change in coupling relation as a function of the angle of rotation is mostly as shown in Fig. 2.

In order to overcome this inconvenience a fixed coupling coil is connected in series or in parallel with the variable coupler coil, the former inducing in a phase opposite to that of the latter and being so dimensioned that the resulting coupling zero of the combination comes to lie at a flat point of the coupling graph of the mobile coil.

Referring to Figs. 3a and 3b, let 3 denote the mobile and 2 the fixed coupling coil inducing in opposite sense. If the mobile coil 3 presents zero coupling, then the fixed coil 2 insures closest coupling for the system. But if the coil sizes have been properly chosen, and if the mobile coupling coil presents closest coupling, the couplings of both coils relative to coil 1 are just neutralized, and the system or combination presents zero coupling. It will thus be seen that the change in coupling relation thus attained is just the opposite of what it used to be in the customary cases as illustrated in Figs. 1a, b, c, and d. What is attained as a result is that the change of coupling in the neighborhood of zero coupling is very slight, so that this latter point can be easily obtained. The change in coupling in dependence upon the angle of rotation has a shape or trend as illustrated approximately in Fig. 4.

The effect obtained shall be explained by the aid of an arrangement as shown in Fig. 1d where the variation in coupling relationship is secured by the rotation of the rotor coil inside the stator coil, the explanation being analogous for other mechanical forms of construction.

Rotating the rotor coil inside the stator coil, the former is turned inside a substantially constant flux of the fixed coil. The change in flux and thus in coupling, as will thus be seen, is sinuous, with zero coupling located at sin 0°, in other words, at a steep portion of the sine curve (Fig. 5). But if another fixed coupling coil is connected in series with the movable coil as pointed out above, the trend of the change or variation of coupling is inversed, and as a result a flat or slow change is obtained in the neighborhood of zero coupling. In fact zero coupling lies now around $$\sin \frac{x}{2}$$

(Fig. 6).

I claim:

1. In a variable coupling arrangement for coupling two inductively related systems, a primary coil associated with one of said systems and a secondary coil associated with the other of said systems one of said coils being movable with respect to the other thereof so that varying amounts of energy may be induced from one of said systems to the other thereof, an auxiliary coil associated with the primary coil and so wound with respect to said primary coil that energy induced thereby upon the secondary coil opposes energy induced by the associated coil upon the secondary coil, the dimensions of the auxiliary coil with relation to the associated coil being such that the point of zero coupling between the related systems occurs in the vicinity of the points where the coupling between the primary and secondary coils is a maximum thereby locating said point along the flat portion of the characteristic curve of the coupling arrangement indicative of the change in coupling relation as a function of the degree of movements of the movable coil.

2. The combination described in claim 1 wherein the auxiliary coil is connected in series with the movable coil.

GEORG GULLNER.